United States Patent
Luckscheiter et al.

(10) Patent No.: US 6,226,592 B1
(45) Date of Patent: May 1, 2001

(54) METHOD AND APPARATUS FOR PROMPTING A MOTOR VEHICLE OPERATOR TO REMAIN WITHIN A LANE

(75) Inventors: Kirk Luckscheiter, Farmington Hills; Robert Lougheed, Ann Arbor, both of MI (US)

(73) Assignee: Veridian ERIM International, Inc., Ann Arbor, MI (US)

( * ) Notice: Subject to any disclaimer, the term of this patent is extended or adjusted under 35 U.S.C. 154(b) by 0 days.

(21) Appl. No.: 09/273,867

(22) Filed: Mar. 22, 1999

(51) Int. Cl.[7] ............................ G01S 7/78; G06F 17/10
(52) U.S. Cl. .................... 701/301; 701/200; 701/23; 701/26; 180/411; 180/422
(58) Field of Search .......................... 701/301, 26, 116, 701/200, 23, 41; 180/411, 422

(56) References Cited

U.S. PATENT DOCUMENTS

| | | | |
|---|---|---|---|
| 3,744,587 | * 7/1973 | Schimkat et al. | 180/446 |
| 4,970,653 | * 11/1990 | Kenue | 701/301 |
| 5,368,484 | * 11/1994 | Copperman et al. | 434/69 |
| 5,517,412 | * 5/1996 | Unoura | 701/23 |
| 5,540,298 | * 7/1996 | Yoshioka et al. | 180/169 |
| 5,595,271 | * 1/1997 | Tseng | 191/4 |
| 5,621,645 | * 4/1997 | Brady | 701/117 |
| 5,642,093 | * 6/1997 | Kinoshita et al. | . |
| 5,661,472 | * 8/1997 | Koshizawa | 340/901 |
| 5,720,361 | * 2/1998 | Nishimoto et al. | 180/446 |
| 5,742,141 | 4/1998 | Czekaj | 318/587 |
| 5,790,403 | * 8/1998 | Nakayama | . |
| 5,922,036 | * 7/1999 | Yasui et al. | 701/28 |
| 5,957,983 | * 9/1999 | Tominaga | 701/23 |
| 5,991,427 | * 11/1999 | Kakinami et al. | 382/104 |
| 6,005,492 | * 12/1999 | Tamura et al. | . |
| 6,009,377 | * 12/1999 | Hiwatashi | 701/301 |
| 6,053,270 | * 4/2000 | Nishikawa et al. | 180/168 |
| 6,055,467 | * 4/2000 | Mehring et al. | 701/23 |

\* cited by examiner

*Primary Examiner*—William A. Cuchlinski, Jr.
*Assistant Examiner*—Olga Hernandez
(74) *Attorney, Agent, or Firm*—Gifford, Krass, Groh, Sprinkle, Anderson & Citkowski, PC

(57) ABSTRACT

A system assists the driver of a motor vehicle to travel within a designated driving lane defined by one or more lane boundaries. The lane boundary is sensed as the vehicle moves within the lane while monitoring the position of the vehicle relative to the lane boundary. The operation of the vehicle is then adjusted as a function of the proximity of the vehicle to the lane boundary. In one embodiment, the operation of the vehicle is affected by adjusting the functioning of the steering wheel, preferably by providing tactile feedback which causes the driver to experience a virtual change in lane elevation as the vehicle approaches the lane boundary. In the preferred embodiment, the tactile feedback causes the vehicle operator to experience the lane as having a depression with sloping sidewalls. Where the lane boundaries are defined by visual lane markers, the lane-boundary sensor preferably takes the form of a video camera to image the lane markers.

11 Claims, 1 Drawing Sheet

METHOD AND APPARATUS FOR PROMPTING A MOTOR VEHICLE OPERATOR TO REMAIN WITHIN A LANE

FIELD OF THE INVENTION

This invention relates generally to motor vehicle operation and, in particular, to a system for providing the operator of a motor vehicle with feedback regarding lane boundaries.

BACKGROUND OF THE INVENTION

The safety of vehicles and highways has been steadily improving over the past few decades to the point that, on an individual basis, fatal accidents are relative rare. In fact, fatal accidents are now less than 1.7 per 100,000,000 miles traveled. This means that further improvements in vehicle design and infrastructure will produce progressively smaller reductions in rates at increasing costs. Put another way, the easy problems have been solved and it is becoming increasingly difficult to realize further improvements.

A recent study by Dupont Health and Safety showed that the numbers of fatalities and lost work days were so small that it was virtually impossible to reduce them further. The recorded injuries showed random casualty, and it was determined that it would be ineffective to work on reducing such random occurrences to any significant degree. The solution, they found, is in reducing near accidents, and particularly in understanding and reducing risk/behavior.

The same principle holds for highway accidents. Namely, that serious injuries and fatalities are usually the probablistic result of repeated patterns of risky behavior. If risky behavior can be reduced, a reduction in all types of accidents may be realized overall.

SUMMARY OF THE INVENTION

This invention resides in methods and apparatus for assisting the driver of a motor vehicle to travel within a designated driving lane, thereby helping to curb otherwise random risky behavior. Assuming the driving lane is defined by two or more lane boundaries, a method aspect of the invention includes the steps of sensing the lane boundary as the vehicle moves within the lane, monitoring the position of the vehicle relative to the lane boundary, and effecting the operational characteristics (especially the steering sensation) of the vehicle as a function of the proximity of the vehicle to the lane boundary. In one embodiment, the operation of the vehicle is affected by adjusting the functioning of the steering wheel, preferably by providing tactile feedback which causes the driver to experience a virtual change in lane elevation as the vehicle approaches the lane boundary. In the preferred embodiment, the tactile feedback causes the vehicle operator to experience the lane as having a depression with sloping sidewalls.

In terms of apparatus, a system according to the invention includes a sensor for sensing a boundary defining the lane, processor means for determining the proximity of the vehicle to the lane boundary, and an actuator for affecting the operation of the vehicle as a function of the proximity of the vehicle to the lane boundary. Where the lane boundaries are defined by visual lane markers, the lane-boundary sensor preferably takes the form of a video camera to image the lane markers. If the vehicle includes a rear-view mirror, the video camera may be supported thereon.

In addition to, or apart from, affecting the functioning of the steering wheel as the vehicle approaches the lane boundary the system may also cause a vibration to be felt by the operator or activate a visual and/or audible alarm as the vehicle approaches the lane boundary. In affecting the functioning of the steering wheel, tactile feedback means preferably cause the vehicle operator to experience a resistance to turning the vehicle as the vehicle approaches the lane boundary, thereby creating the sensation that the lane features a virtual depression having raised sidewalls.

DETAILED DESCRIPTION OF THE INVENTION

Figure 1:
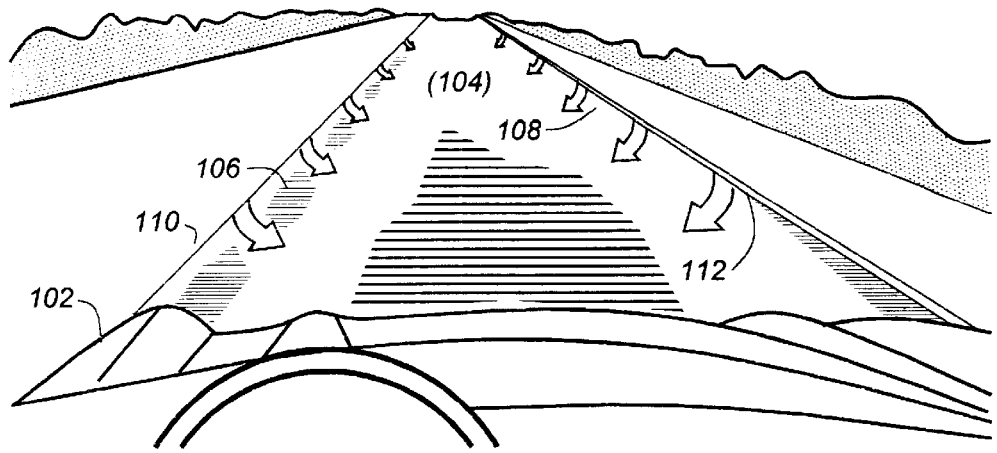
FIG. 1 is a perspective view of the road in front of a vehicle as seen by an operator, indicating how the invention is used to create virtual sloping shoulders on either side of a traffic lane.

Reference is made to the drawings in general, and to FIG. 1 in particular, which shows the view through the windshield of a vehicle 102 incorporating the invention. Through the use of lane-boundary sensing and feedback techniques discussed in more detail below, the operator of the vehicle senses that the lane 104 is formed in a depression having sloping sidewalls 106 and 108. The recessed lane of FIG. 1 does not physically exist as shown in the drawing, but rather, according to a preferred embodiment, the functionality of the vehicle's steering wheel is adjusted so that the operator of the vehicle experiences a recessed roadway having the virtual sidewalls 106 and 108. As discussed further below, the invention preferably accomplishes this task through the use of an actuator which makes it more difficult to turn the steering wheel as the vehicle gets closer to one (or both) of the boundaries 110 and 112 of the lane 104. Apart from, or in addition to, this modification of steering-wheel functionality, a vibration may be generated, preferably simulating "speed bumps." An audible and/or visible feedback alert may be generated as well as a function of proximity to the sidewalls.

Figure 2:
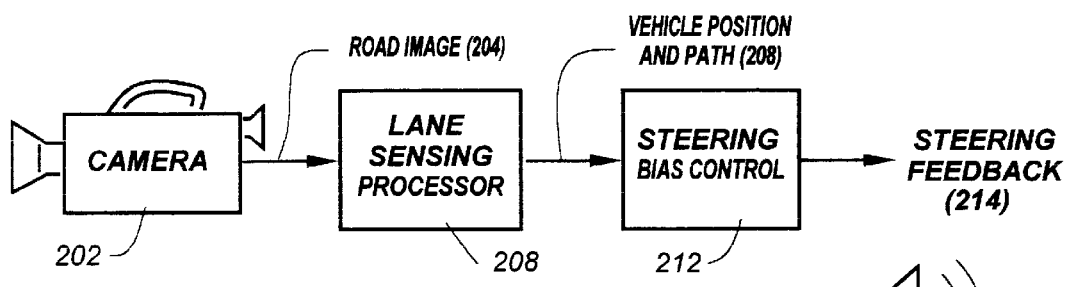
FIG. 2 is a block diagram used to illustrate major electrical subsystems according to the invention.

FIG. 2 is a block diagram which illustrates major subsystems according to an apparatus aspect of the invention. In a preferred embodiment, a camera 202 is used to gather an image of the road as seen forward of the vehicle, generating a signal along path 204. This signal 204 is fed to a lane sensing processor module 206 which includes pattern-matching applications software enabling the image gathered by camera 202 to be analyzed and compared with templates enabling the boundaries 110 and 112 of lane 104 in FIG. 1 to be visually recognized. The lane marks are visualized on at least a periodic basis and compared to a pattern representative of ideal within-lane operation, such that if the vehicle maneuvers into too close a proximity to either side, a signal is sent along path 208 to a feedback processor 212. An audible (210), visible or tactile (vibrational) alert may then be activated.

The operation of the lane sensing processor 206 may be similar in certain functional respects to that disclosed in U.S. Pat. No. 5,595,271 to Tseng entitled "Electrical Vehicle Pick-Up Position Control." In this patent, a camera is used to image lane markers, and a processing unit compares the alignment of the marks with the longitudinal axis of the vehicle to determine whether the vehicle is "off course." Although the system of the '271 patent is disclosed for the purposes of aligning a battery-recharge coil relative to a road surface, the applicable aspects of image processing are incorporated herein by reference.

Continuing the reference to FIG. 2, the output of the lane sensing processor 206 is delivered along path 208 to a tactile feedback processor 212 which, in turn, outputs a signal 214 to a torque motor attached to the steering system of the vehicle. The use of tactile feedback with respect to steering wheels is well known in other fields such as virtual reality, and existing principles regarding the same are incorporated herein by reference. For example, U.S. Pat. No. 5,595,271 teaches a steering-wheel system incorporating tactile feedback embodying principles applicable to the instant invention.

Figure 3:
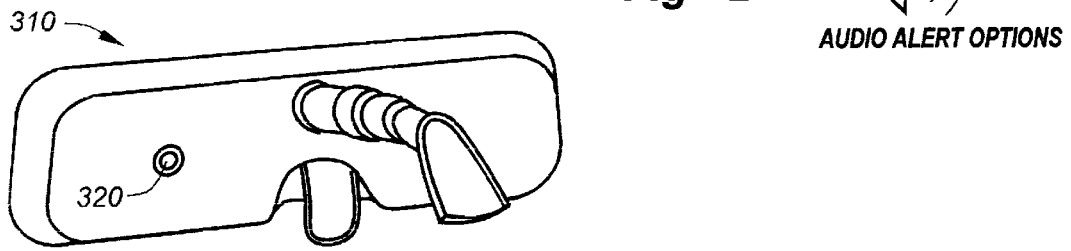
FIG. 3 is an oblique drawing used to illustrate a preferred rear-view mirror mounting of a video camera used according to one aspect of the invention.

In a preferred embodiment, the camera 202 is mounted as inconspicuously as possible within the motor vehicle. For example, as shown in FIG. 3, the camera 320 is mounted on the back side of a rear view mirror indicated generally at 310, enabling the device to look outwardly through the windshield of the vehicle without interfering with the operator's view.

Figure 4:
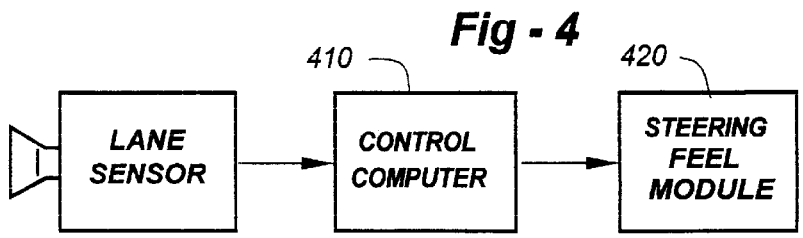
FIG. 4 is a more comprehensive electrical block diagram showing the way in which inventive apparatus may be integrated into the network of a motor vehicle.

FIG. 4 illustrates a block diagram representative of a more comprehensive implementation embodying the invention, wherein a central control computer 410 is interfaced to a steering feel module 420 which includes the subsystems of FIG. 2, less the video camera 202. Due in part to the overall control and integration with other functional units, for instance a navigation and direction system, various alternative modalities are made possible through the invention. For example, the feedback supplied to the operator's steering wheel may be progressively increased from a slight resistant to full force as the vehicle gets further from the center of the lane. Additionally, the amount of feedback may increase as the vehicle speed increases such that, for example, a virtual depressed road surface is not developed below a speed of, say, 30 mph. Stronger feedback may be provided if solid or double lines are present as opposed to intermittent lane-markers.

As to other types of alternative modalities made possible by the invention, the feedback provided to the steering wheel will be decreased if lane sensing confidence falls due to reduced visibility through weather, worn paint, or other environmental/visual factors. The feedback will be removed if the brake is on, as a safety measure in a critical situation where resistance to turning the vehicle may not be desirable. The system will visually indicate to the driver that the system has been disabled. Likewise, the feedback will be removed if a forward collision warning system has been activated and detects a potential collision. In all cases, pertinent information regarding the operation of the vehicle, including the use of the force feedback, may be recorded in a non-volatile memory so that driver behavior may be analyzed after the fact, including subsequent to an accident.

We claim:

1. A system for use with a motor vehicle having a steering wheel to assist the operator thereof to remain within a driving lane defined by two lane boundaries, the system comprising:

sensor means for sensing the lane boundaries;

processor means for determining the proximity of the vehicle to the lane boundaries; and an actuator for affecting the operation of the vehicle as a function of the proximity of the vehicle to one of the lane boundaries, including tactile feedback means causing the operator to experience, the lane as having a virtual depression with raised edges.

2. The system of claim 1, wherein the lane boundaries are defined by visual lane markers, and wherein the sensor means includes a video camera having a field of view which includes two or more of the lane markers.

3. The system of claim 2, wherein the vehicle includes a rear-view mirror, and wherein the video camera is supported on the rear-view mirror.

4. A system for use with a motor vehicle having directional signals and a steering wheel to assist the operator thereof to remain within a driving lane defined by two lane boundaries, the system comprising:

sensor means for sensing the lane boundaries;

processor means for determining the proximity of the vehicle to the lane boundaries;

an actuator for affecting the operation of the vehicle as a function of the proximity of the vehicle to one of the lane boundaries; and;

wherein at least the actuator is disabled if the directional signals are being used.

5. A method of reminding the driver of a motor vehicle having a steering wheel to remain within a driving lane defined by one or more lane boundaries, comprising the steps of:

sensing the lane boundary as the vehicle moves within the lane;

monitoring the position of the vehicle relative to the lane boundary; and affecting the functioning of the steering system as a function of the proximity of the vehicle to the lane boundary by providing tactile feedback to the driver through the steering wheel.

6. The method of claim 5, wherein the lane boundary includes a visual marker, and wherein the step of sensing the lane boundary includes visually recognizing the marker.

7. The method of claim 5, wherein the tactile feedback is such that the driver experiences a virtual change in lane elevation as the vehicle approaches the lane boundary.

8. The method of claim 5, wherein the motor vehicle further includes directional signals, and wherein the step associated with affecting the functioning of the steering system is defeated if the directional signals are activated.

9. A method of reminding the driver of a motor vehicle having a steering wheel to remain within a driving lane defined by two or more lane boundaries, comprising the steps of:

sensing the lane boundary as the vehicle moves within the lane; and providing a force to the steering wheel causing the operator to experience the lane as having a depression with sloping sidewalls.

10. The method of claim 9, wherein the motor vehicle further includes directional signals and wherein the step associated with providing a force to the steering wheel is defeated if the directional signals are activated.

11. A system for use with a motor vehicle having a steering wheel to assist the operator thereof to remain within a driving lane defined by two lane boundaries, the system comprising:

sensor means for sensing the lane boundaries;

processor means for determining the proximity of the vehicle to the lane boundaries; and an actuator which causes a vibration that can be felt by the operator as the vehicle approaches either of the lane boundaries.

* * * * *